Patented Nov. 4, 1941

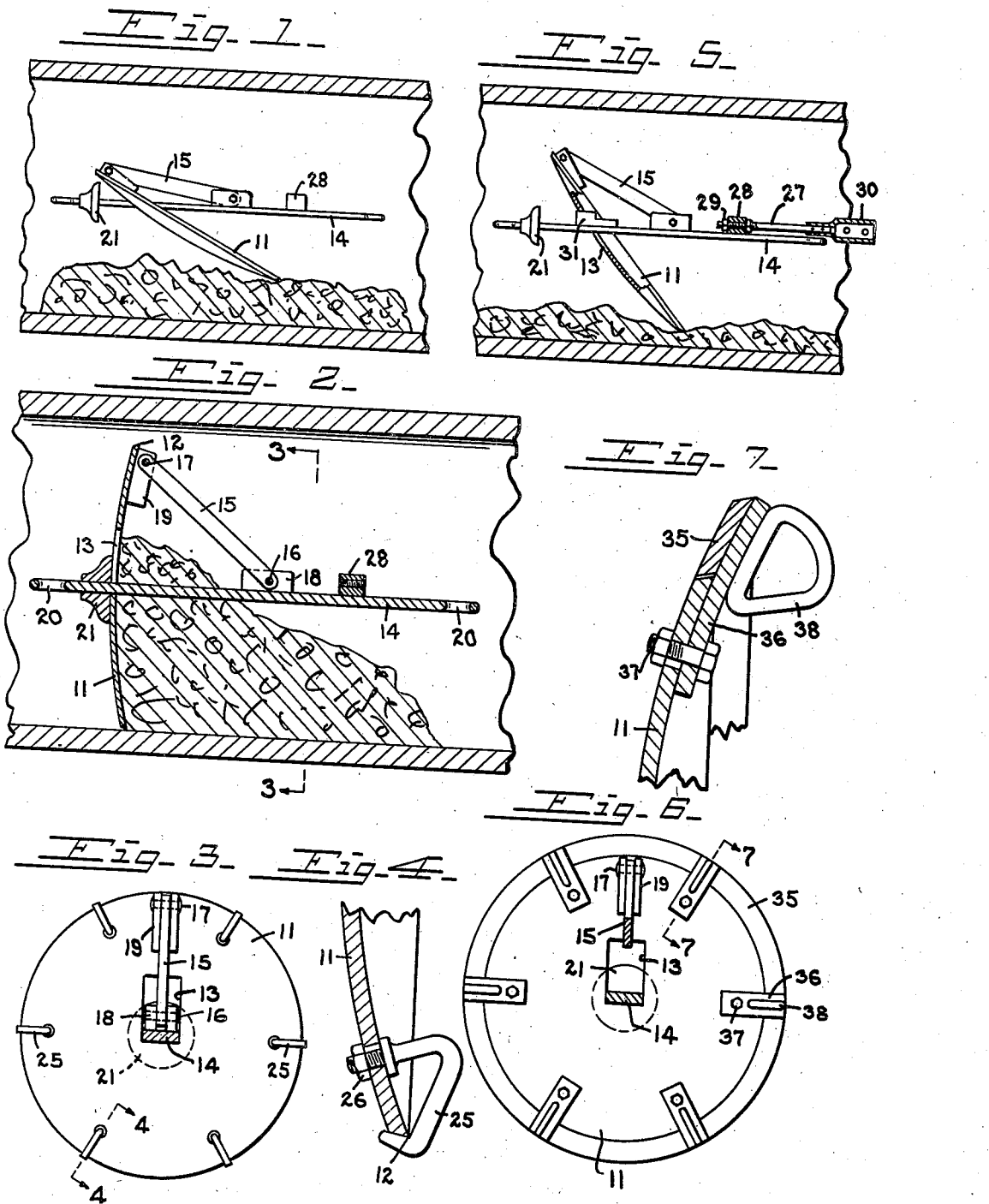

2,261,687

UNITED STATES PATENT OFFICE 2,261,687

SEWER CLEANING DEVICE

William G. Lowry, Cincinnati, Ohio

Application March 1, 1939, Serial No. 259,196

1 Claim. (Cl. 15—104.16)

My invention relates to an improved device for cleaning sewers and other drainage passages of debris and deposits that accumulate therein, in a simple and extremely efficient manner.

The object of my invention is to provide a member which can be drawn into the sewer over the deposits therein and which will assume, upon being drawn in the opposite direction, a position capable of drawing the deposits therewith forward through the sewer.

A further object is to provide means on the cleaning member to prevent the cleaning member from catching on rough spots in the sewer or on the joints of the same and causing damage thereto.

A further object is to provide the pull-bar with positive abutting means for supporting the cleaning member.

A still further object is to provide means for increasing the diameter of the cleaning member.

My invention will be further readily understood from the following description and claim, and from the drawing in which latter:

Fig. 1 shows the device in a position being drawn into a sewer.

Fig. 2 is an enlarged sectional view of the device in cleaning position.

Fig. 3 is a sectional detail of the disc, taken in the plane of the line 3—3 of Fig. 2, with the skids attached thereto.

Fig. 4 is a detail section of the skid, taken on the line 4—4 of Fig. 3.

Fig. 5 is a view similar to Fig. 1, with attachments thereon.

Fig. 6 is an end elevation of the disc with the ring attached thereon, and;

Fig. 7 is a detail section of the same, taken on the line 7—7 of Fig. 6.

The scraping or cleaning element of my device comprises a concave disc 11, having a comparatively sharp circumferential edge 12. The disc is provided with an elongated central opening 13 arranged to be received over a pull-bar 14. When the disc is in an upright position for cleaning, the bar is central of the disc and it rests on the lower face of the opening 13. A link 15 is pivoted to the bar as at 16, and to the disc as at 17, being supported and guided in the lugs 18 and 19 respectively. The link causes the disc to fold or assume a position along the bar when the device is being drawn into a sewer and also causes the disc to assume a vertical position when the bar is being drawn in the opposite direction. Each end of the bar 14 is formed with an eye 20 to which suitable cables can be secured for drawing the bar in either direction. The bar is also provided with positive abutting means in the form of a collar 21, welded to the bar and arranged to form a positive stop and support for the disc when it is in an upright position. This collar carries the load and the link merely actuates the disc from its tilted position to an operating position.

In Figs. 3 and 4, I have shown the disc equipped with skids 25 hooked over the edge of the disc and clamped to the disc by means of nuts 26. A suitable number of these skids may be attached to the disc about its periphery to insure the disc passing through the sewer without catching on joints or other projections that may protrude along the surface being cleaned.

In Fig. 5, I have shown the pull-bar equipped with a pull-rod support, which consists of a rod 27 threaded into a lug 28 on the bar and held therein by nuts 29. Suitable rods can be attached to the bar by insertion into the tubular end 30 of the rod. Under certain conditions it is desirable to have a rod attached to the device for hand operation. I also show a boss 31 attached to the pull-bar by suitable screws to limit the angular tilt of the cleaning disc while it is being drawn into the sewer. I have found that certain deposits in sewers are such that the cleaning disc will not readily dig in if the disc lays at too great an angle. Therefore I provide the boss to limit the angular position of the disc while it is being drawn into the sewer.

In Figs. 6 and 7, I have shown means for increasing the size of the cleaning member, comprising a ring 35 having inwardly extending bars 36 arranged to be bolted through the skid bolt holes and clamped thereto by means of bolts and nuts 37. Each of the bars 36 is provided with a skid 38.

In using my improved sewer cleaner, suitable cables are atached to each end of the pull-bar and the disc is drawn into the sewer with the disc tilted as shown in Fig. 1. Upon movement of the bar in the opposite direction the disc will dig into the debris and assume a position as shown in Fig. 2. A suitable winch is attached to the cable and the bar and disc are drawn forward carrying the debris therewith.

My invention contemplates the use of various size discs for use in sewers of various sizes and I have found that the most practical size to use is a disc two inches smaller in diameter than the internal diameter of the sewer. But in cases where roots and other growths have encircled the interior of the sewer it is necessary to increase the size of the disc after drawing a regular disc through the sewer to remove most of the debris. Thus the ring shown in Fig. 6 is added to bring the disc to a size almost equal to the interior size of the sewer to cut away all roots, etc.

Having thus fully described my invention, what I claim as new and desire to secure by Letters Patent, is:

A sewer cleaning device comprising a concave scraping disc having a sharpened edge, a pull-bar extending through said disc and provided with cable attaching means at each end thereof, said bar provided with a fixed collar forming a stop to abut the convex side of the disc in operative position, a forward link connection between the disc and bar, and a ring attachable to the periphery of said disc to increase the size of the disc, said ring extending generally in the plane of the disc and having extensions for securing said ring to said disc.

WILLIAM G. LOWRY.